United States Patent
Shekhawat et al.

(10) Patent No.: US 7,269,038 B2
(45) Date of Patent: Sep. 11, 2007

(54) VRMS AND RECTIFIED CURRENT SENSE FULL-BRIDGE SYNCHRONOUS-RECTIFICATION INTEGRATED WITH PFC

(75) Inventors: Sampat Shekhawat, Mountaintop, PA (US); Ronald H. Randall, Cuba, NY (US); Dong-Young Huh, Bucheon-si (KR)

(73) Assignee: Fairchild Semiconductor Corporation, South Portland, ME (US)

( * ) Notice: Subject to any disclaimer, the term of this patent is extended or adjusted under 35 U.S.C. 154(b) by 49 days.

(21) Appl. No.: 11/224,167

(22) Filed: Sep. 12, 2005

(65) Prior Publication Data

US 2007/0058402 A1  Mar. 15, 2007

(51) Int. Cl.
*H02M 7/48* (2006.01)
(52) U.S. Cl. .......................... 363/71; 363/81
(58) Field of Classification Search ............ 363/70–74, 363/124, 126, 37, 65, 79–81, 89; 323/222, 323/207, 272
See application file for complete search history.

(56) References Cited

U.S. PATENT DOCUMENTS 4,449,176 A * 5/1984 Turnbull ...................... 363/81
6,411,535 B1 * 6/2002 Roux ......................... 363/124
6,738,274 B2 * 5/2004 Prasad et al. ................. 363/70

* cited by examiner

*Primary Examiner*—Rajnikant B. Patel
(74) *Attorney, Agent, or Firm*—Cesari & McKenna, LLP (57) ABSTRACT

A synchronous full bridge rectifier is controlled to provide a power factor near unity. The full bridge rectifiers are transistors each with a controlling input. The AC input signal and currents within the circuit are sensed and sent to a controller. In response, the controller output control signals to turn on/off the rectifying MOSFETS on a timely basis to form a power factor of near one with respect to the AC input signal. The full wave rectifier is made of N-channel MOSFET's, some with fast body diodes. The MOSFET's are rectifiers and PFC control elements. The result is a one stage synchronous rectifier with PFC. A solid state precision analog differential amplifier senses the AC line waveform and high frequency current transformers sense the currents. The controller accepts the inputs of the amplifier and the sensed currents and outputs control signals that turn on and off the four MOSFET's. The timing of turning on/off is arranged so that the current drawn from the AC source is sinusoidal and matches the phase of the sinusoidal AC source.

8 Claims, 8 Drawing Sheets

VRMS AND RECTIFIED CURRENT SENSE FULL-BRIDGE SYNCHRONOUS-RECTIFICATION INTEGRATED WITH PFC

BACKGROUND OF THE INVENTION

1. Field of the Invention

The present invention relates AC source voltage sensing and current sensing in a synchronous rectifier, and, more particularly, to such sensing in a full bridge synchronous rectification with PFC (power factor correction).

2. Background Information

Figure 1:
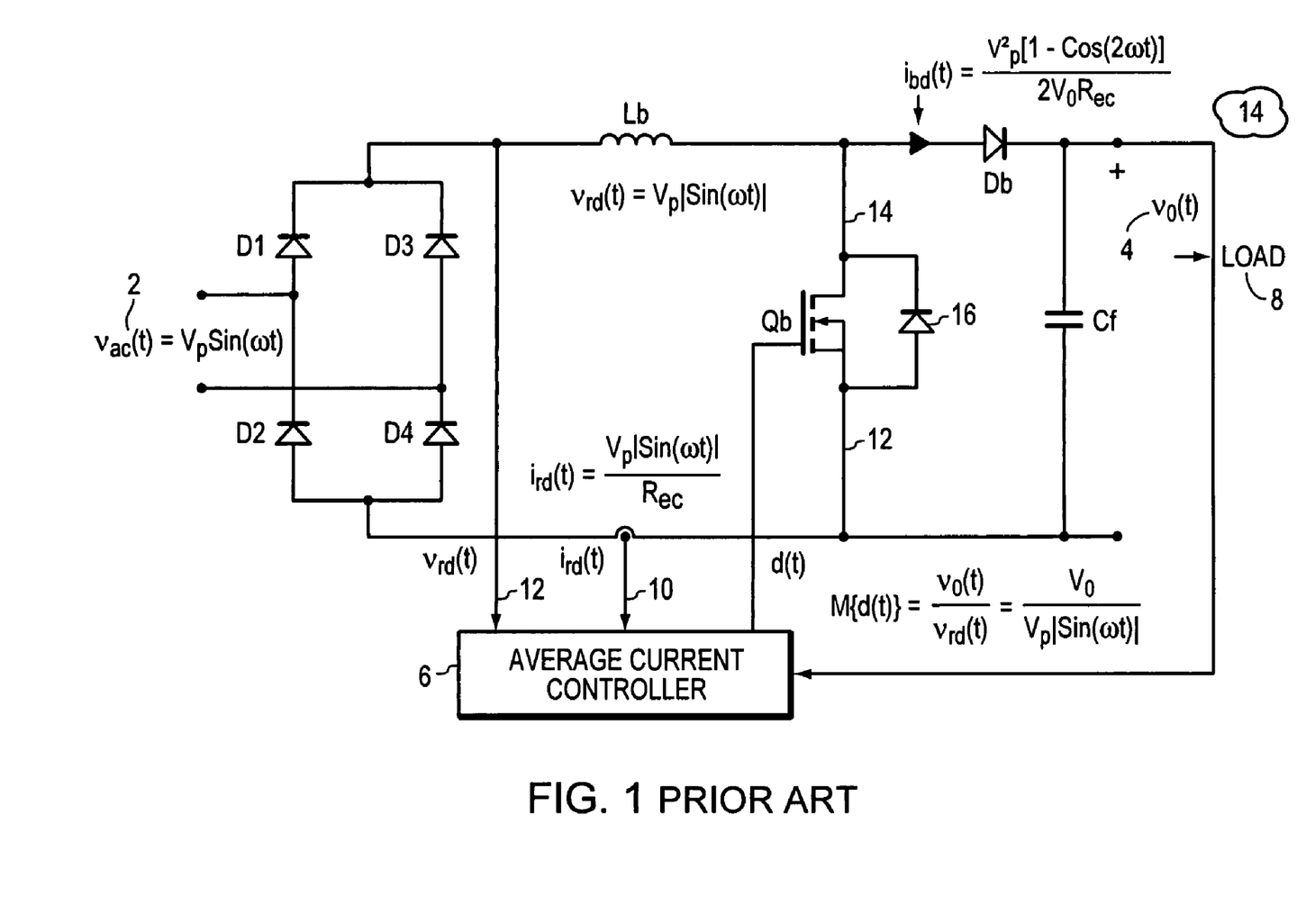
FIGS. 1 and 2 are schematics of prior art circuits.

FIG. 1 is a prior art schematic for a basic rectification, boost circuit that converts an AC (alternating current) input voltage 2 into a DC (direct current) output voltage 4. This circuit has two stages, the first being the diode full wave rectifier composed of D1-D4, and the second being a boost inductor Lb, boost switch Qb, boost diode Db, and an output filter capacitor, Cf. Qb is an N-channel MOSFET where a positive voltage between the gate 10 and the source 12 will turn on Qb and present a low impedance path for current to flow from the drain 14 to the source 12. As shown, the MOSFET Qb has an internal body diode from source to drain 16, that can carry current when the source is at a higher voltage than the drain.

The diodes D1-D4 constitute a full wave rectifier bridge providing a rectified sinewave voltage 12 at the left end of inductor Lb. The power MOSFET Qb is turned on and off by the average current controller 6 at a switching frequency much higher than the AC mains input voltage. Typical switching frequencies are in the range of 40 kHz to 100 kHz. The average current controller pulse width modulates (PWM) the conduction of Qb to force the fundamental current in Lb to be similar in shape to the rectified voltage 12. For example, when the anode of D1 is driven positive with respect to the cathode of D4 by the AC input voltage, the boost inductor Lb is charged (current builds up) through D1, Qb, and D4 back to the AC input 2. When Qb is turned off, the voltage at the anode of Db rises until Lb discharges through Db, and load 8 and the parallel capacitor Cf; and D4 back to the AC source 2. Db prevents the capacitor Cf from discharging back through Qb when it is turned on. The output voltage 4 will be regulated at some DC level, typically 400 Vdc for 120/240Vac AC mains input. On the next AC mains half cycle, Lb is charged via D3, Lb, Qb and D2 back to the AC voltage source. Again when Qb is turned off, Lb discharges through Db and load 8 and parallel capacitor Cf and regulates the output voltage 4 at some level.

The prior art controller 6 of FIG. 1 is designed to vary the d(t) signal pulse width such that the current $i_{rd}(t)$ 10 is proportional to the rectified voltage $v_{rd}(t)$. If it is precisely proportional, the power factor would be 1.0, but in practice the power factor will only approach 1.0. As discussed below, that correction works to make the load on the AC voltage source be resistive. In such a case, the current load will be proportional to (i.e., sinusoidal and in phase with) the AC voltage source 2.

In these prior art circuits shown in FIG. 1, the voltage $v_{rd}(t)$ is sensed at the cathodes of D1 and D3, and the load current 10 may be sensed with a current transformer or by sensing the voltage drop across a series resistor.

U.S. Pat. No. 6,738,274 B2 ('274) is directed to a switch-mode power supply where circuit losses are reduced and power factor is corrected. However, in this patent the current sensing and voltage sensing are not shown or discussed in any detail. If resistors and 50/60 Hz transformers are used, as in the prior art, many of the advantages of this patent will be unfulfilled. A series current sensing resistor dissipates power and 50/60 Hz line voltage sensing transformers are lossy and physically bulky. The prior art current sensing via a resistor typically must use an IGBT (an insulated gate bipolar transistor) and separate anti-parallel diodes D10, D12 FIG. 2. The generation of the control signal, see FIG. 5 of the '274 patent, is not detailed in this patent. However, as mentioned above, the design of logic circuitry for the controller or use of a large scale IC (integrated circuit) computer to generate such control signals are known to those skilled in the art.

Figure 2:
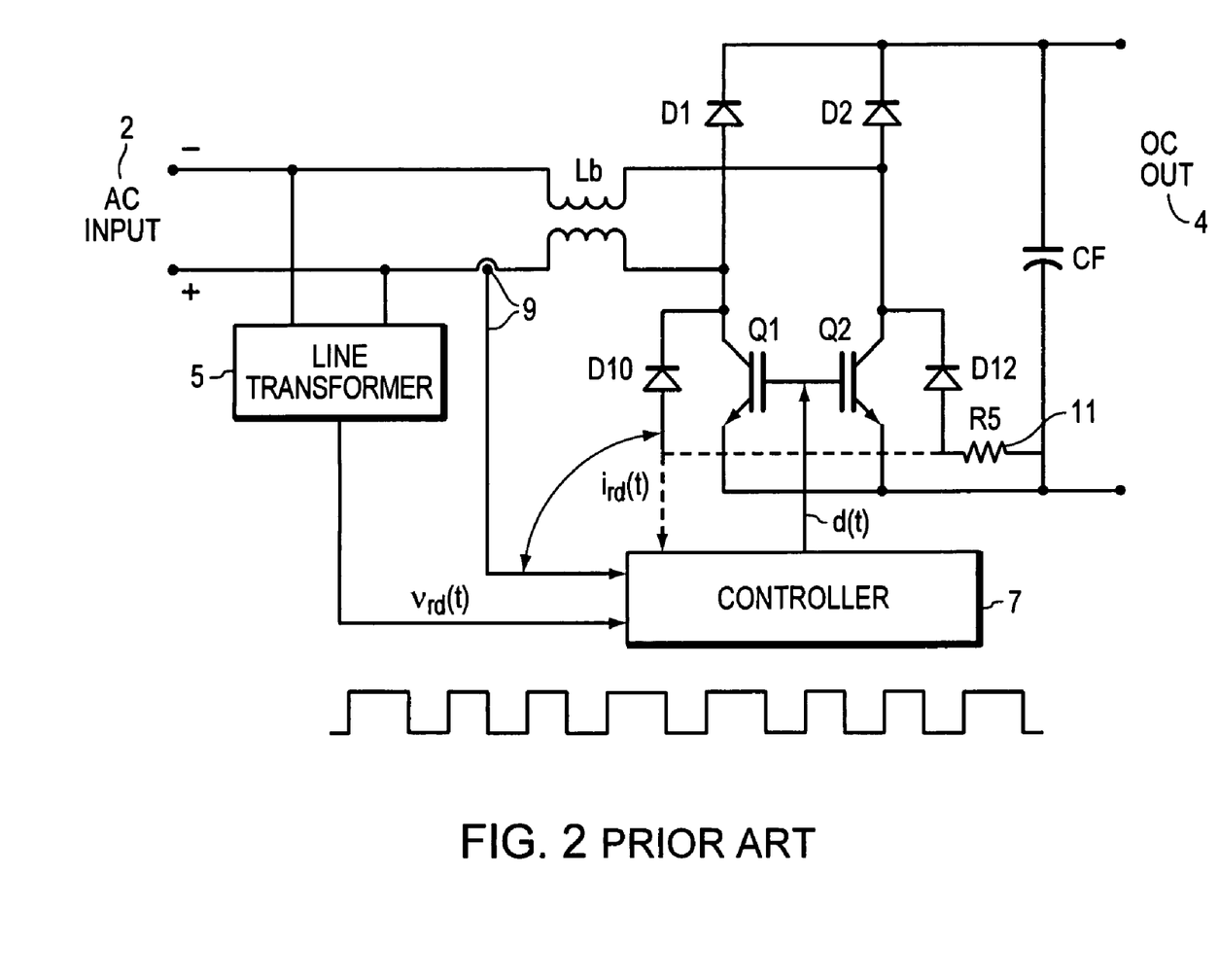

The operation of the circuit of FIG. 2 is similar to that of FIG. 1, except the PFC function is integrated with the rectification function. The controller operates the IGBT switches Q1 and Q2 so that the load on the AC input appears resistive. The boost inductor, Lb, in this example, is divided into two windings typically on a common core. During the AC input half-cycle when the AC voltage polarity is as labeled in FIG. 2, the charging of the inductor Lb is via Q1, and the discharge is controlled by turning on and off Q1. During this cycle the discharging of the inductor is accomplished via D1, Cf, the load and D12. During the alternate AC input half cycle the discharge path is via D2, the load and D10. The contents of the controller may be a processor that drives Q1 and Q2 to achieve a PFC near unity—that is the load on the AC input appears to be resistive.

Still referring to FIG. 2, a 50/60 Hz AC line transformer provides an isolated representation vrd(t) of the input AC signal to the controller 7. The secondary of this transformer is full-wave rectified to provide a signal proportional to the absolute value of the AC input. The transformer is necessary to elimate the common mode voltages that exist between the AC input and the controller (minus output) common. The current ird(t) drawn from the AC input signal may be sensed from a transformer 9 or from a series resistor Rs. The sensed current is input to the controller 7. The controller outputs switching frequency PWM d(t) signals, in response to the vrd(t) and ird(t), that drives the gates of Q1 and Q2 in order to make the load on the AC input be resistive.

The circuitry to generate these control signals for the circuits in FIGS. 1, 2, 3 and 4a is well within the capability of those skilled in the art. The controller circuitry will include low voltage (+12-15V DC) power supply and programmable digital electronics to generate the signal and the timing shown in the diagrams.

Figure 3:
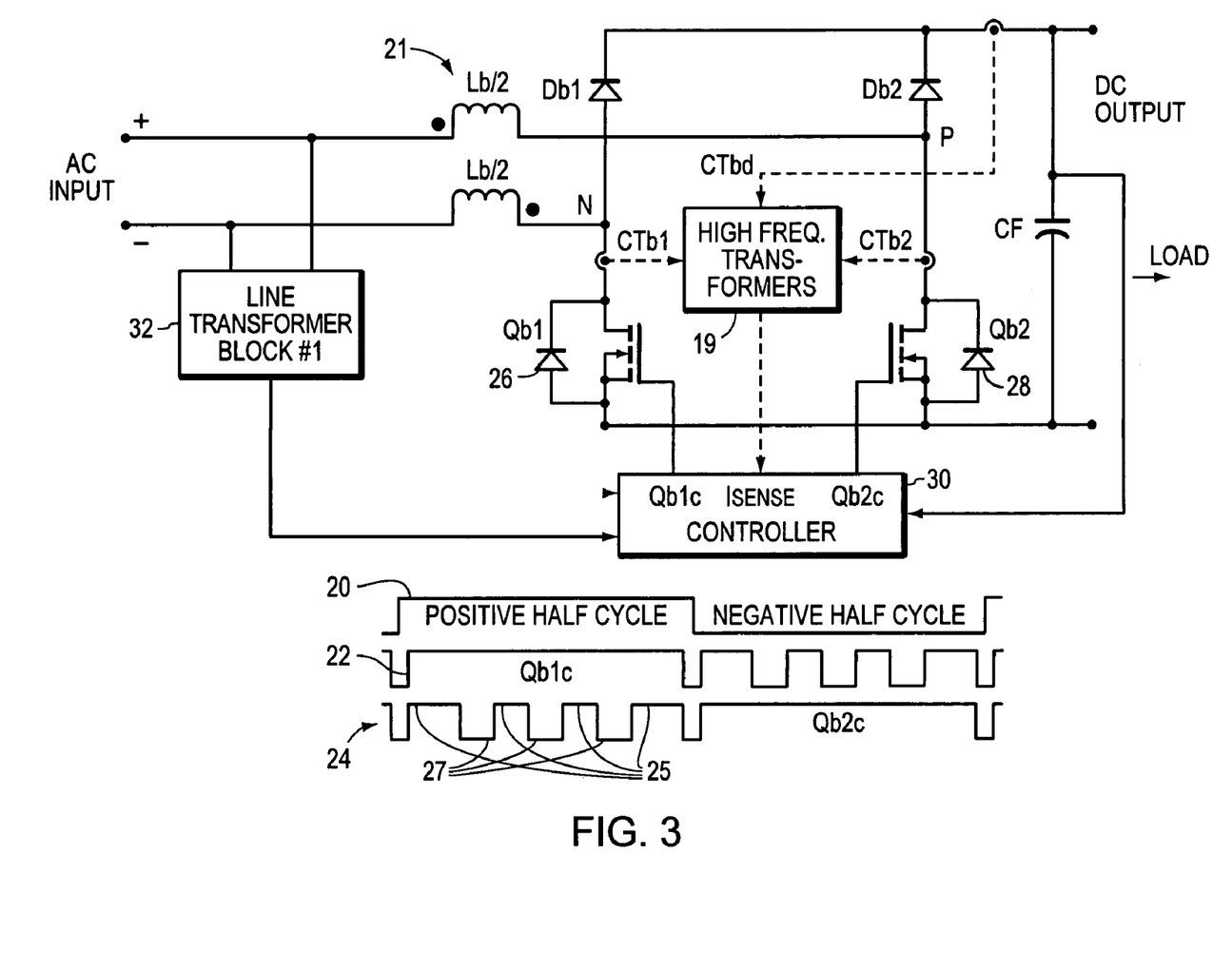
FIG. 3 is an example of the inventive circuit and its control signals.

Notice, also, that the circuit of FIG. 1 has two stages, the rectifier diodes and then the power factor correction stage, while the rectification and power factor control are manifest within a single stage in FIG. 2. In FIGS. 2 and 3 a 50/60 Hz transformers are used to sense the AC input voltage. These transformers are big, bulky, lossy and expensive. The transformer is also not able to operate under the conditions of a DC input voltage which may occur for some broad range input applications. An example would be the application of a DC battery voltage to provide UPS (Uninterruptible Power System) features.

PF is the ratio of real power to apparent power and is expressed as a decimal running from 0 to 1.0. Real power is measured for AC signals as the time integral of (volts as a function of time) multiplied by (amps as a function of time).

That is $$\text{Real Power} = \frac{1}{T} \cdot \int_0^T V(t) \cdot I(t) dt.$$

Apparent power or Volt*Amperes is the product of RMS voltage times RMS current. Displacement PF traditionally is expressed in terms derived from the phase difference between a sinusoidal voltage and a sinusoidal current with PF equal to the cosine of the phase angle between voltage and current. If the load were purely reactive, either capacitive or inductive, the PF is zero. This means that no real is power is dissipated as the reactive component receives power but later returns the power. This is, of course, an illustrative example as there will always be some power dissipation in the actual components in a circuit, e.g., diodes, switches, transformers, etc. However, even in the illustrative example, if no real power were dissipated, there is real current and real voltage signals involved. So, if a circuit breaker carries the real current in the powerless case, the breaker may still blow. This is the reason that loads on a circuit breaker with reactive components will not be able to draw as much power as a resistive load. For example, a resistive load presents a PF of 1, but any load with a power factor less than one will draw power reduced by the power factor. So a resistive load might draw a maximum current (say, to not trip a breaker) from a line, but a load with a PF of 0.5 would only be able to draw ½ the maximum power and still not trip a circuit breaker. One way of expressing the issue of PF, is that the power available from an AC circuit is:

Pout=(V)(I) (PF)(E). Where the V and I are rms values, and where E is a measure of the power loss of any connecting circuitry.

Another issue with reactive loads is that, when the stored power is returned to the original source, say typically to the AC line or mains socket, the power company and other users on the same line must be able to handle it. But, if the returned power includes the harmonic and non-linear current of a low power factor system, there may be related problems and unusual behavior for other users of the same power source.

When the AC load is a switch-mode power supply, the current drawn is non-linear with a power factor typically of about 0.65. The current pulses are short, discontinuous pulses. Besides being careful of tripping circuit breakers, such non-linear current pulses produce harmonics that contribute to noise and to unwanted heating of the connecting circuitry, wiring, etc. It should be noted that the 0.65 PF of a typical "capacitor input" switch-mode power supply is created primarily by the harmonic currents and not by the phase angle between the fundamental (sinusoidal) line voltage and current. In this case, the ampere term in the denominator of the power factor equation is in the form $$\text{Iac RMS} = \sqrt{I_{fund}^2 + I_{3rd}^2 + I_{5th}^2 + \ldots}$$

where $I_{fund}$ is the fundamental frequency and $I_{3rd}$, $I_{5th}$ and etc. represent each of the current harmonics.

Switch-mode power supplies routinely include PFC circuitry to overcome the above problems, and, maybe more importantly, harmonic content fed into power sources are limited by government regulatory agencies.

Reiterating, known PFC switch-mode power supplies with a PFC controller include current and voltage sensing that dissipate too much power and are bulky.

SUMMARY OF THE INVENTION

The limitations of the prior art and other advantages are realized by a method and a synchronous full bridge rectification circuit. An AC input signal drives a boost inductor that connects to a full wave rectifier. The output of the full wave rectifier is a DC output signal. The operation of the circuit provides a PF of near unity by controlling the rectification timing in a PWM manner.

A controller receives the AC input signal from which the controller determines the zero crossing points and peak of the AC input signal. The controller turns on and off two switches that form part of a full wave rectifier (with two diode) and are in the charging path of the boost inductor. The currents in the DC output line and in each of the two switches are sensed and sent to a controller that in turn turns the switches on and off in a manner to achieve a PF of near unity.

In another embodiment, the diodes are replaced with two additional controllable switches. The four switches still form the full wave rectifier. Similar to the two switch circuit, controller above, the controller in this circuit turns on and off each of the four switches in a manner to achieve the unity PF. Preferably, these four switches (and the two in the above two diode circuits) are MOSFET transistors. In one illustrative circuit, some of these MOSFET's may have inherent body diodes that are faster than typical body diodes. A fast body diode turns off quicker than the body diodes of similar MOSFET's. The sequence and timing of this turning on and off is implemented in the controller to force the load current from the AC input signal to be resistive.

In one illustrative embodiment, a differential amplifier and precision rectifier circuit is used in place of AC line transformers to provide a representation of the AC input signal to the controller. The current provided to the DC output and the currents in each of the rectifier switches involved with the charging of the boost inductor are sensed and provided to the controller. The controller compares the AC input signal and the sensed currents and drives the rectifier switches on and off with timing that controls the power factor of the full bridge rectifier circuit.

In one preferred embodiment, the MOSFET's are n-type and the two used as discharge paths from the boost inductor to the DC output are made with fast body diodes. However, in soft turn on/off operation fast diode body diodes are not needed.

In an illustrative embodiment, the current sensing is performed using ferrite toroidal transformers.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Prior art FIG. 2 is an improvement over FIG. 1, and FIG. 3 illustrates an inventive circuit that is an improvement over FIG. 2. In FIG. 3 the current sensing is via high frequency transformers 19. The load current, and the current through the return switches, Qb1 and Qb2 are sensed with the high frequency transformers. The diodes D2 and D4 of FIG. 1 are replaced by Qb1, and Qb2, respectively, and the timing charts shown below are implemented by a controller 30. Also, the boost inductor is split in into two Lb/2 sections 21 with mutual inductance between the two inductors Lb. These two inductors share a common magnetic link with the "dots" 21a indicating the winding polarities. During a positive power cycle 20, node P is positive, Qb1 is driven on 22 synchronously with the start of the positive AC input cycle, to provide a return path for current from point P through Lb/2, Qb2 and/or Db2 and any load. During this positive cycle, Qb2 acts as a boost switch (to charge and discharge the inductors Lb/2) and is intermittently driven on/off 24 during that AC input half cycle. When Qb2 is on 25 during the positive half cycle, the inductors Lb/2 are charged via Qb2. When Qb2 is off 27, the inductors Lb/2 are discharged through Db2 and the load/capacitor. During this positive half cycle, 20 Qb1 is biased on continuously and both the Lb/2 charging and discharging currents flow backwards through the parallel combination of Qb1 and its body diode.

During the negative half cycle, the roles are reversed—Qb2 is synchronously driven on and Qb1 is intermittently driven on/off. During these cycles, body diode 26 of Qb1 and the body diode 28 of Qb2 also conduct current.

Still referring to FIG. 3, there is a line isolation transformer 32, its output is fed to the controller 30 to allow the controller to determine the zero voltage cross over point of the AC input signal, and to determine the peaks of the AC input waveform. This is necessary in order to synchronously turn on and off the transistors, and to ensure that the current sensed matches the sinusoidal character of the AC input waveform. The line transformer secondary voltage is full-wave rectified by a diode bridge or electronic ideal bridge equivalent to provide a signal proportional to the instantaneous absolute value of the AC input voltage.

$$Vac_{ref} = \frac{N_{sec}}{N_{prim}} |V_{peak} \cdot \sin(\omega \cdot t)|$$

(i.e., where $V_{peak}$ is the peak of the AC input). The instantaneous polarity of the transformer secondary voltage is used by the controller 30 to determine whether Qb1 or Qb2 should be maintained on continuously in the rectifier mode during that AC input half cycle.

The sensed current signal, which is a rectified replica of the AC input current, is sent to the controller 30. The controller, using these voltage and current signals will compensate and correct for power factor by varying the conduction duty cycle of the boost switches (Qb1 and Qb2) during the half cycles when they act as boost switches. The resulting current drawn from the AC source is sinusoidal and in phase (resistive) with a sinusoidal AC source voltage. When the voltage and the current waveforms are both sinusoidal and in phase with each other, the PF (power factor) will be (close to) 1.

Figure 4A:
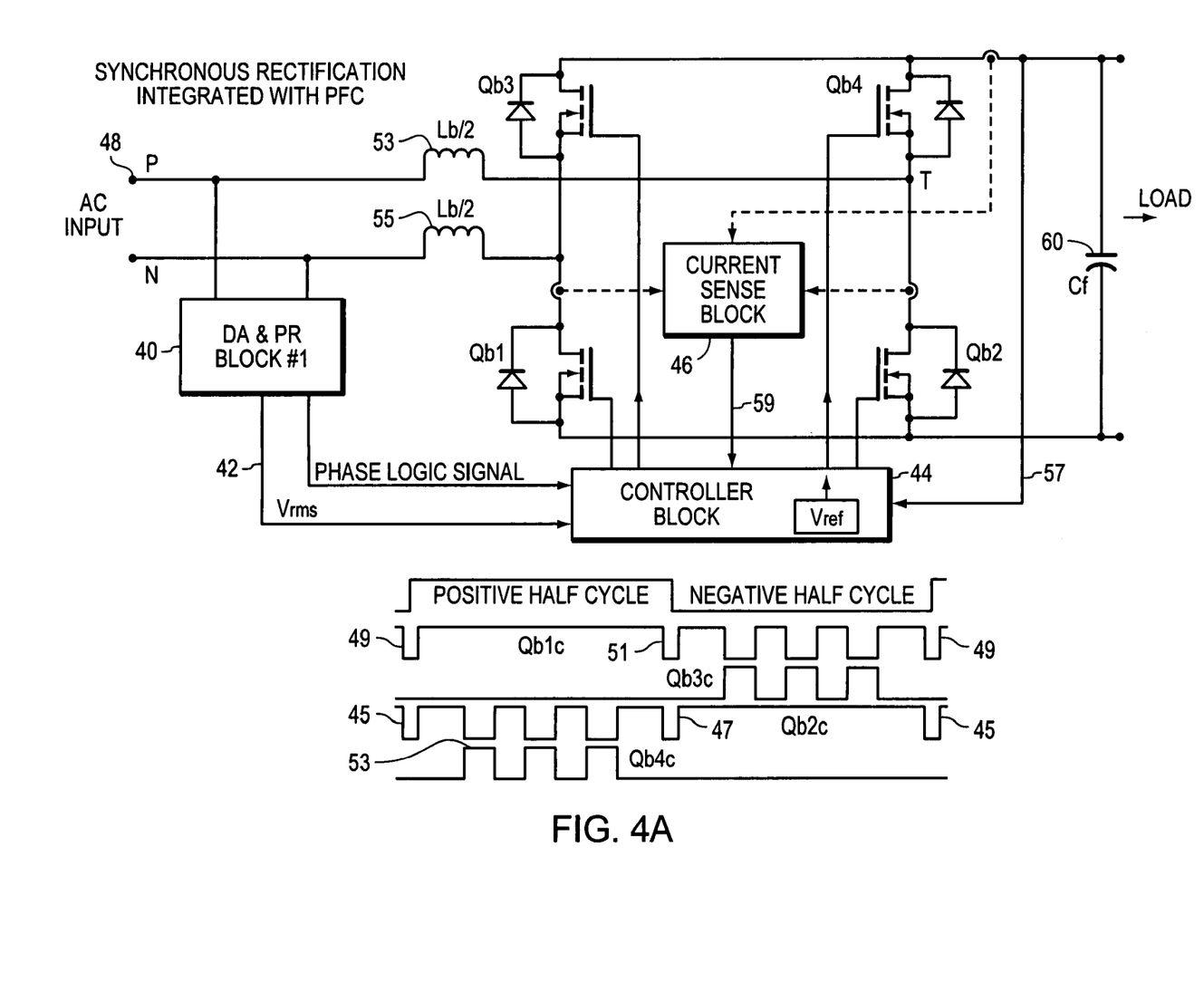
FIG. 4A is another example of the inventive circuit and its control signals.

The circuit of FIG. 4A includes the following changes with respect to the circuit of FIG. 3: a) the line transformer 32 is replaced by a true differential AC voltage sensing circuit and a precision analog rectification circuit, DA & PR 40, this circuit presents a form 42 of the AC input voltage 48 to the controller block 44; b) the rectification boost diodes Db1 and Db2 of FIG. 3 are replaced by fast body diode N-channel MOSFET's Qb3 and Qb4; and c) the controller 44 drives Qb3 and Qb4. The controller block 44 performs similarly to the controller 30 in FIG. 3 in that it drives the rectifiers, Qb1-Qb4, on and off in such a manner that the load on the AC source 48 is resistive.

The four MOSFET's Qb1, Qb2, Qb3, and Qb4 are n-type and the diodes shown across each of the MOSFETS is the body diode inherent in the MOSFET structure. The need for fast body diodes of Qb3 and Qb4 is so that recovery currents and resulting voltages in the synchronous rectifier are controlled.

Figure 4B:
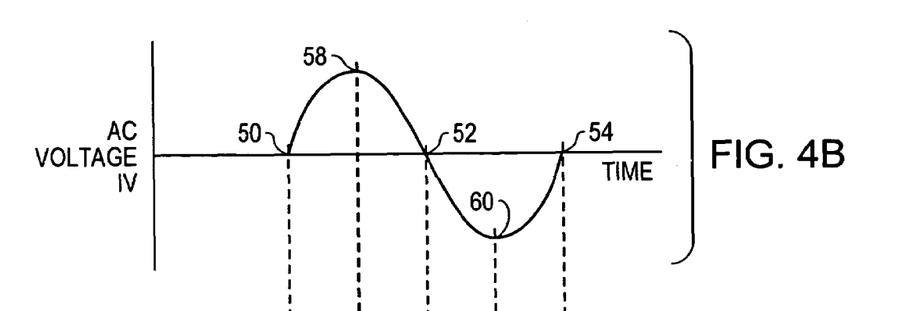
FIGS. 4B, 4C and 4D are additional timing signals for the FIG. 4A circuit.
Figure 4C:
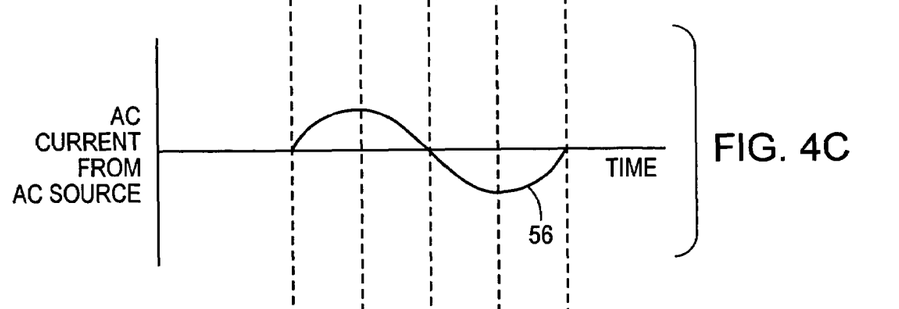
Figure 4D:
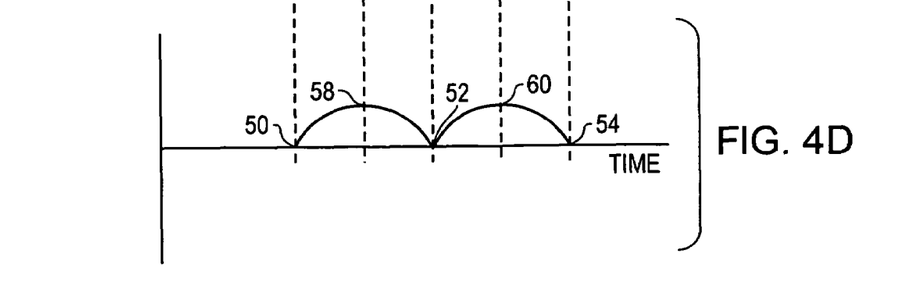

In more detail, referencing FIGS. 4B, 4C and 4D, the designed relationship of the AC input voltage signal and the current 56 from the AC source are shown. The current 56 is controlled by Qb1-Qb4 being turned on and off by the controller 44 to achieve the relative waveforms of FIGS. 4B, 4C. FIG. 4D is a precision full wave rectified signal Vrms 42 from the block 40. Here, the crossover points 50, 52, and 54, and the peaks 58 and 60 of the AC voltage waveform are determined and used by the controller 44 to drive the gates of Qb1-Qb4 to force the load on the AC source to be resistive.

The current sense 46 of FIG. 4A contains high frequency current transformers that may be small, low cost ferrite toroids. These transformers sense and measure, see FIG. 5, the current out to the filter capacitor 60 and any load; and the currents through Qb1 and Qb2. These signals are summed and input 59 to the controller 44. The summation of these current transformer secondary currents is input to resistor R1 to generate a voltage signal that is proportional to the rectified AC input current. High frequency current transformers may be used since there are no 50/60 AC line frequency components in the currents applied to these transformers. Higher frequency ferrite toroid transformers are smaller, less costly and more efficient.

Figure 5:
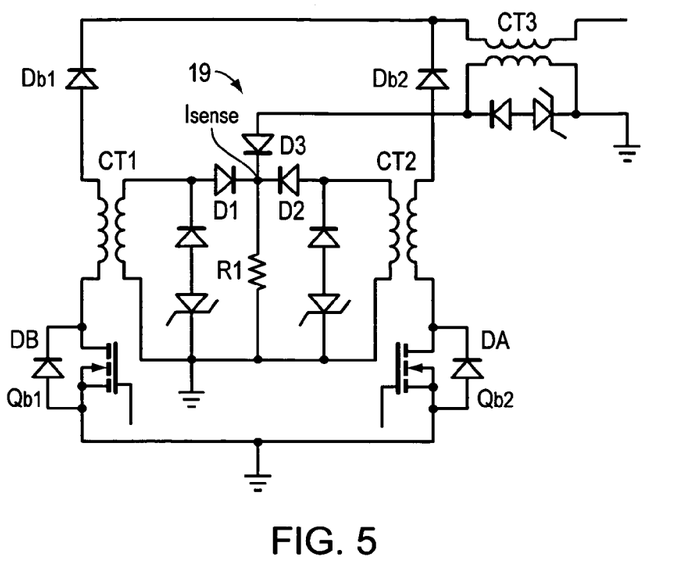
FIG. 5 is a schematic block diagram of the current sense of FIG. 4A.

FIG. 5 is a schematic of the current sense circuitry of item 46 of FIG. 4A. There are three high frequency toroidal current transformers, CT1, CT2, and CT3. The resulting currents are rectified and summed through diodes D1, D2, and D3 respectively, into a common resistor R1 to provide a signal that represents the rectified current drawn from the AC input. This signal is input to the controller item 44 of FIG. 4A. The circuit of FIG. 5 operates on the basis that only one CT is active (as a current transformer) at any point in time. When Qb1 is switching and Qb2 is conducting reverse current, CT2 is saturated by the continuous current flowing backward through diode DA of Qb2. Here CT2 is contributing no signal. CT1 is active when the boost FET Qb1 is on and a current signal proportional to Qb1 current flows through D1 to R1. CT3 is active when Qb1 is off and a current proportional to boost current through Db1 flows through D3. The sum of these two currents is converted to a voltage across R1. This signal is a good representation of the AC input current. There are clamping zener diodes placed across each CT secondary that limit the peak secondary voltage during the transformer flux reset. This is important especially for CT1 and CT2 to limit voltage during reverse current conduction in Qb1 and Qb2 until their respective CT's saturate. The clamp diode and zener across the secondary of CT3 prevent the reverse recovery currents of boost diodes Db1 and Db2 from generating excessive reverse voltages across D3.

Figure 6A:
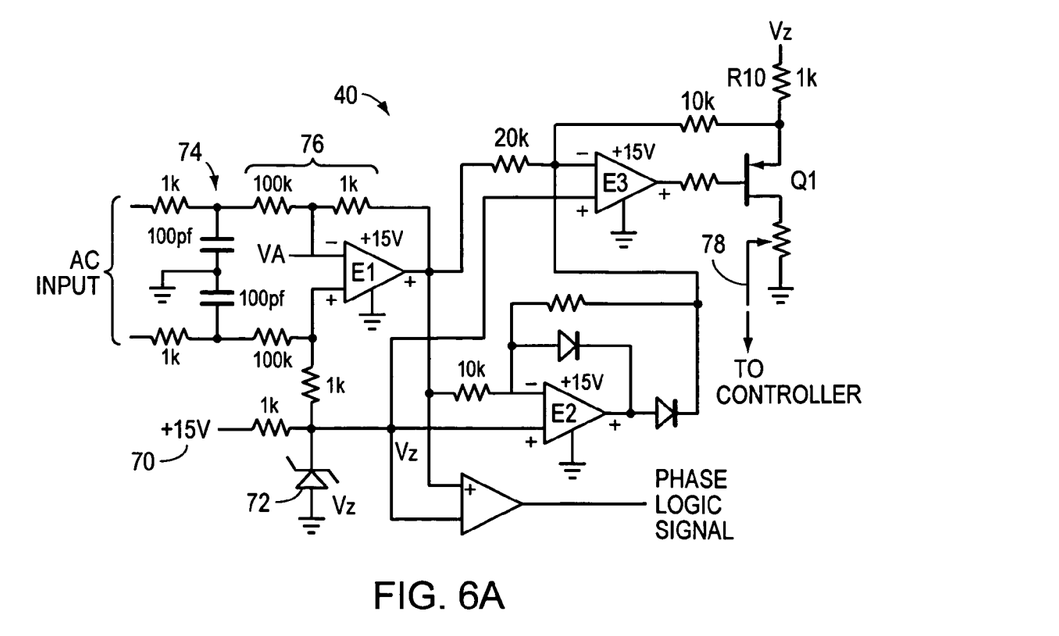
FIG. 6A is a schematic block diagram of DA & PR of FIG. 4A

The DA-PR (differential amplifier-precision rectifier) item 40 of FIG. 4A is shown in more detail in FIG. 6A. In prior art circuits, a bulky 50/60 Hz transformer was used to isolate the secondary from common mode signals that might appear on the AC input lines. In the present invention, such a transformer is replaced by the circuit illustrated in FIG. 6A. A +15 volt bias supply 70 is used to activate the zener diode 72 to provide a voltage Vz of +5.1 V. This Vz is fed as shown to one side of the amplifiers E2 and E3. This Vz is used to prevent common mode input signals from pulling E1+input below the ground and to bias the operation of E1 output to allow an AC output signal without the AC output swing being limited by the power and ground rails. The input filters 74 attenuate high frequency voltage spikes that would be beyond the frequency response capabilities of E1. The 100K and 1K resistors 76 around E1 provide a true differential voltage gain of 0.01. The signal VA, with a sinusoidal input AC input of 264 VAC RMS having a peak voltage of 373 V, will range form +3.15V to +6.85V and not reach ground potential. For the 264 VAC RMS input condition the E1 output signal is centered around the Vz voltage with a maximum value of +8.7V and a minimum value of +1.3V. The output of E1 is input to a precision negative rectifier consisting of amplifiers E2 and E3. The output of this rectifier is developed across RIO by the PNP transistor Q1. Q1 then converts this signal to a current source 78 proportional to the rectified AC input voltage. This current source is then used as the reference for the controller 44 of FIG. 4A.

Figure 6B:
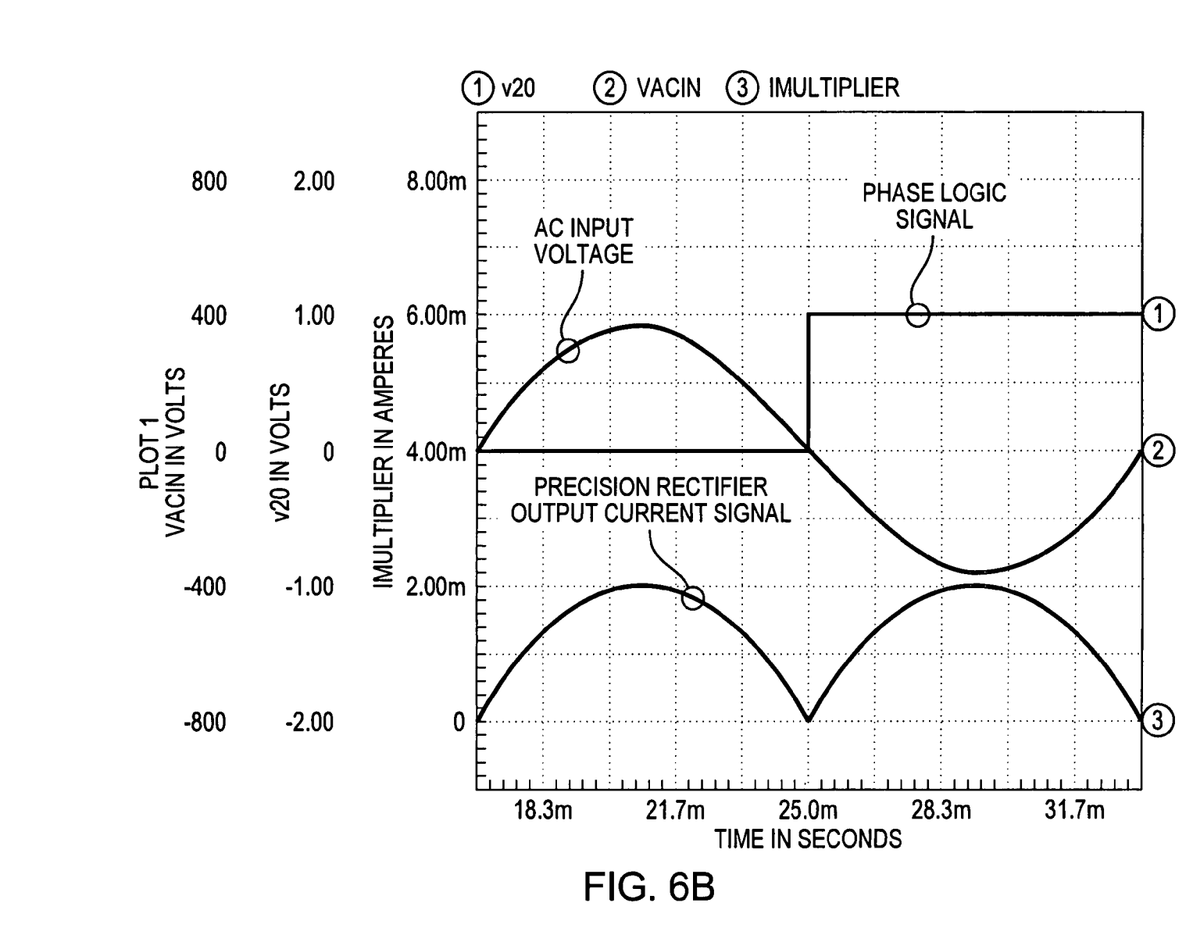
FIG. 6B are more detailed timing signals.

Amplifier/comparator E4 of FIG. 6A compares the output of E1 with the 5V Vz reference and outputs a synchronizing control signal to controller 44 providing the logic information as to which of the switch pairs Qb3 and Qb1 or Qb4 and Qb2 should be operated in the switching mode during the alternate ½ cycles of the AC input. FIG. 6B shows m timing signals with specific parameters of the DA/PR 40 of FIG. 4A.

Referring back to FIG. 4A, the controller 44, as mentioned above, turns on and off Qb1-Qb4 with respect to the timing of the AC source signal to create an in phase sinusoidal load on the AC source. This turning on and off may be viewed as PWM (pulse width modulation) of the rectifier to achieve the resistive load on the AC input. As mentioned above for FIGS. 1 and 2, the design of the controllers 6 and 30 to create proper PWM timing signals is known to those skilled in the art. Note that the signals for Qb1c and Qb2c of FIG. 3 are identical for Qb1 and Qb2 of FIG. 4A. Also, the timing signal for Qb4 is identical to that of Qb2, except for a phase inversion and the signals 45 and 47 at the positive/negative transition points in the signals for Qb2. Also, the timing signal for Qb3 is similarly identical to that for Qb1 except for a phase inversion and the signals, 49 and 51, at the positive/negative transition points in the signals for Qb1. Also, soft turn-on is when the current to the filter capacitors is switched (not shown), in such a case the fast body diode MOSFET's Qb3 and Qb4 may be replaced by regular MOSFET's.

As discussed above, the controller 19 of FIGS. 3 and 44 of FIG. 4A perform many identical functions so that the design of controller 44 is similar to that of controller 19, and both designs are known to those practitioners in this technical art.

The synchronous nature, as understood by those skilled in the art, of the rectification is defined and indicated by Qb1 being driven on during an entire half cycle and by Qb2 being driven on during the other half cycle. The logic for determining whether Qb1 or Qb2 is turned on during a given ½ cycle of the AC input is provided by the before mentioned synchronization control signal from the output of E4 of FIG. 6A Still referencing FIG. 4A, in the positive half cycle, the controller 44 detects the zero crossing point of the AC source via block 40. The controller turns on Qb1. The controller then turns on Qb2 intermittently where Qb2 performs the charging and discharging cycles as described above. During the same positive half cycle Qb4 is intermittently turned on to accommodate the charging/discharging action of Qb2. For example, during the positive half cycle, when Qb2 is on, current flows from the AC input 48 through the inductor 53, through Qb2 and Qb1, through inductor 55 and back to the/AC source. This is charging the inductors, and Qb3 and Qb4 are off. At time 53, Qb2 is turned off and Qb4 is turned on. At this time, current travels from inductor 53 through Qb4 to the capacitor 60 and load, through Qb1 back to the inductor 55. This is the discharging cycle described above. This operation continues throughout the AC input positive half cycle. The timing of the control signal by the controller block 44 creates a load current from the AC source that is in phase and sinusoidal so that the PF is near 1. During the negative AC input cycle, similar operation occurs. In practice, logic might be added such that there is a dead time, e.g. 250 nsec, in place between the turn-off and turn-on of Qb1, Qb2, Qb3 and Qb4. This will prevent shoot through current spikes when Qb3 and Qb1 or Qb4 and Qb2 would conduct simultaneously shorting the output capacitor. Since Qb3 and Qb4 are not turned on until after the dead time, the initial reverse current is through their body diodes.

In FIG. 4A, the controller 44 contains a dc voltage reference Vref and compares the DC output 57 with Vref. These signals form part of a low frequency control feed back loop where the output voltage level 57 is regulated with respect to the Vref magnitude.

Figure 7:
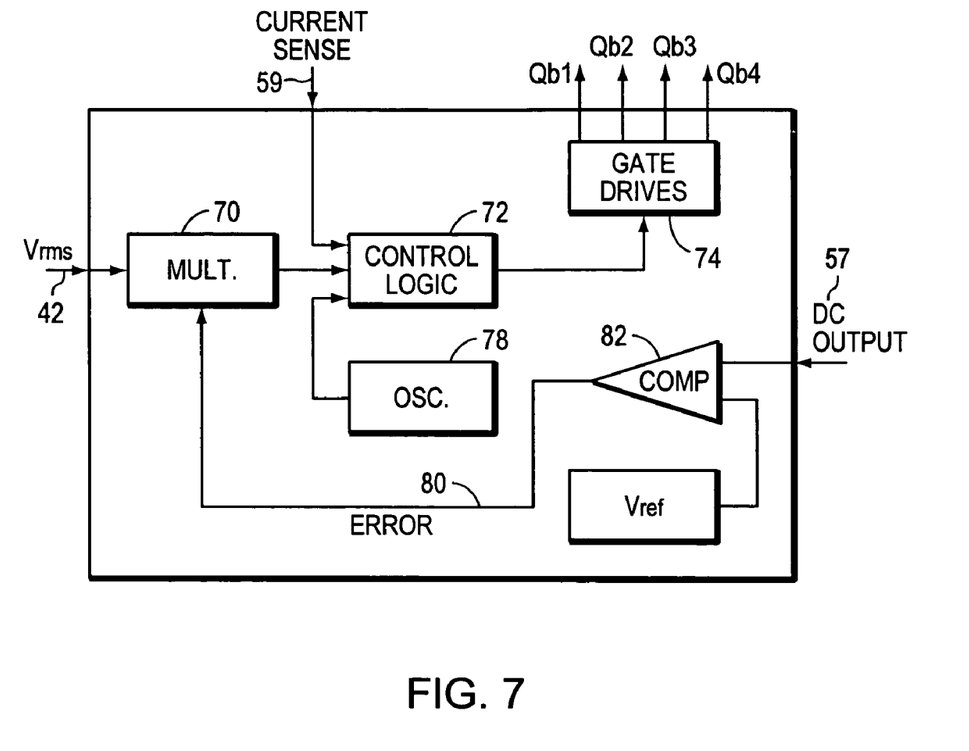
FIG. 7 is a block/schematic diagram of a controller circuit.

FIG. 7 is a schematic block diagram of a controller. The controller compares, in logic block 72, the rectified current signal 59 from block 46 (FIG. 4A) with the rectified, multiplied AC voltage signal 42 from block 40 (FIG. 4A) and creates the PWM gate drive signals for Qb1, Qb2, Qb3, and Qb4. The timing signals are shown in the timing diagram portion of FIG. 4A. An oscillator, 78, provides required timing signals. The oscillator 78 may be fixed, e.g. 100 kHz, or may be spread over a spectrum to reduce conducted and radiated EMI (electromagnetic interference). The switching sequence of the Qb's is controlled by the control logic 72 to force the current sense 59 to be proportional to Vrms 42. This then forces the AC input current to be sinusoidal and in phase with the AC input voltage whereby the PF approaches unity.

When current is flowing in the AC input terminal 48 of FIG. 4A, during a half cycle (of the AC frequency), current will flow from source to drain through the body diode of Qb1 returning to the other AC input terminal. During this half cycle the controller 44 biases Qb1 on so a portion of this current flows in parallel source to drain through Qb1 to reduce the conduction drop across Qb1. The controller, during this half cycle, will modulate transistors Qb2 and Qb4 to force the current signal 59 to be a signal proportional to the AC input signal.

This modulation techniques described above is part of a fast feedback regulator loop. The controller also contains a slow output sense loop that compares the DC output signal 57 with an internally generated reference voltage, Vref 76. This slow loop amplifier 82 compares the DC output 57 to Vref 76 and generates an error signal 80. The Vrms signal 42 is multiplied 70 by the error signal 80 in this slow feed back loop. If the DC output signal decreases, the error 80 signal increases the multiplier constant which increases the effective current reference in the fast current loop. The fast loop responds by increasing the input current from the AC input which drives the DC output signal higher. If the DC output signal rises the operation reverses driving the DC output signal lower.

In more detail, during the above half cycle, either Qb1 or Qb2 will be conducting at the AC line frequency to form a synchronous boost converter with Qb3 conducting in parallel with its body diode to reduce forward conduction losses. The controller block 44 also forces dead time control between Qb1 and Qb3 conduction to prevent cross-conduction "shoot-through," or transient recovery currents formed when switches turn off that may generate high voltages in the presence of inductors, during switching transitions.

The circuit of FIG. 4 may be operated in a continuous current mode where Qb1 will turn on while current in inductor 53 FIG. 4A is still flowing in reverse through Qb3 body diode. The turn on of Qb1 under this condition results in a recovery current spike as Qb3 body diode recovers its reverse blocking capability. This current spike results in turn-on switching losses in Qb1. In another more beneficial mode, a discontinuous current mode, Qb3 may be maintained on until its current reverses to a small forward (drain to source) current. Turning Qb3 off in this mode and slightly delaying QB1's turn on will allow Qb1 to operate in ZVS (Zero Voltage Switching) mode which decreases circuit switching losses and EMI generation.

During the other AC input half cycle, compared to the above description, Qb1 is biased on continuously and Qb2 and Qb4 are modulated on and off to provide the resistive load on the AC input as described above.

The controller block (44) in FIG. 4A compares the rectified input current signal from block 46 with a rectified voltage signal (block 1) and creates modulated gate drive signals for the power MOSFETs (i.e., Qb1 thru Qb4). The modulation switching frequency may be fixed (example 100 kHz) or may be modulated in a spread spectrum manor to reduce the conducted and radiated EMI. The MOSFET switching sequence is controlled to force the current sense signal (block 46) to emulate a signal proportional to the rectified AC input signal. This then forces the AC input current to be sinusoidal at mains frequency for the condition of a sinusoidal input voltage.

Analyzing the mains half cycles when current flow is flowing out of terminal 48. Current will be flowing source-to-drain through Qb2 body diode. During this half cycle Qb2 will be biased on continuously by block 44 such that a portion of this current will be flowing source-to-drain through Qb2 reducing this conduction drop. The Controller block 44 will then modulate transistors Qb1 and Qb3 to force the Current Sense signal (block 46) to emulate a signal proportional to the AC input voltage.

While the modulation technique delineated above is a part of a fast regulator loop, the Controller block also contains a slow output sense loop that compares the DC output load voltage with an internal DC reference and regulates the output voltage. This output loop is accomplished by an internal multiplier function wherein the rectified input voltage signal (block 1) is multiplied by an amplified error signal from the slow output loop. If the DC output (load) voltage decreases, then this slow loop will increase the multiplier constant, increasing the input voltage reference to the fast loop. The fast loop will then increase the input current thus regulating the output voltage.

Further analyzing this mains half cycle on a pulse by pulse bases, either Qb1 or Qb2 will be conducting switching at the switching frequency. The operation is thus that of a synchronous boost converter with Qb3 conducting, in parallel, with its body diode to reduce the forward conduction losses. The controller block also implements dead time control between Qb1 and Qb3 conduction to prevent cross-conduction shoot through during switching transition.

If the circuit is operating in CCM (Continuous Current Mode), Qb1 will be turning on and hard-switch recovering current will be conducted by Qb3. If, however, the circuit is operating in DCM (Discontinuous Current Mode), Qb3 may be maintained on until its current reverses to a small forward (drain-to-source) current. Turning Qb3 off in this mode and slightly delaying turn on of Qb1 will allow Qb1 to operate in ZVS (Zero Voltage Switching) mode which will greatly decrease the circuit switching losses.

During the alternate mains half cycles, Qb1 will be biased on continuously and the modulation function will be performed by Qb2 and Qb4.

The logic within block 44 can be implemented by conventional analog IC technology or through A2D inputs and microcontroller digital techniques. Combinations of analog and digital control are also a possibility with the fast input regulator loop accomplished by conventional analog techniques and the slower output loop provided by digital control.

All this said, Block 44 functions are:
1. Perform multiplier function on Vrms signal from Block #1
2. Perform fast regulator PWM function to force block 46 signal to emulate signal from function 1 above.
3. Slow DC output regulator loop to regulate DC output.
4. Provide gate drive sequence as function of mains half cycles.
5. Gate drive dead-time control to prevent shoot through and/or to provide ZVS operation.

Controller 44 can be implemented, by those skilled in the art, by analog technology or through microcontroller, ASIC's (large scale application specific IC's) or other similar digital circuitry and techniques. Using digital techniques will require analog to digital (A/D; D/A) circuitry as known in the art. In practice combinations of analog and digital circuitry may be used as suits particular applications.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A synchronous full bridge rectification circuit having an AC input and a DC output, the circuit comprising:
    a boost inductor with a first node coupled to the AC signal;
    a full bridge rectifier circuit functionally connected between a second node of the boost inductor and the DC output, the full wave rectifier circuit comprising at least two controllable switches;

means for sensing current in the DC output and in the charging paths of the boost inductor on both half cycles of the AC input; and a controller arranged to receive the AC signal, the sensed currents, and the DC output, wherein the controller outputs signals to control the at least two controllable switches in a manner where the PF of the synchronous full bridge rectifier approaches unity with respect to the AC source, wherein the controller output signal are separate and independent signals, one such signal to each of the at least two controllable switches, wherein in one half cycle of the AC signal, one controllable switch is driven on and the other is intermittently driven on and off, and wherein during the other half cycle of the AC signal the other controllable switch is driven on and the one controllable switch is intermittently driven on and off.

2. The circuit of claim 1 wherein the at least two controllable switching devices comprise:

a first and a second FET (field effect transistor) each FET defining a gate, a drain and a source, wherein the control node controls the conduction between the drain and source of each transistor, and wherein the gates of each transistor are functionally connected to and controlled by the controller, and wherein the full bridge rectifier further comprises:

a third and fourth FET each defining a gate, a drain and a source, wherein the control node controls the conduction between the drain and source of each transistor, and wherein the gates of each FET are functionally connected to and controlled by the controller, and wherein each of the first, second, third and fourth switching devices has a diode with its anode functionally connected to the source and its cathode to the drain.

3. The circuit of claim 1 wherein the means for sensing current comprises toroid current transformers constructed to sense currents at a frequency higher than 50/60 Hz.

4. The circuit of claim 1 further comprising a circuit disposed functionally connecting the AC signal to the controller, the circuit comprising:

a differential amplifier that receives the AC signal; and a rectifier, arranged to receive the output of the differential amplifier and rectify that signal and present that signal to the controller, and wherein the cross over points and peaks of the rectified AC signal are determined and used by the controller together with the sensed current to control the timing of the turning on and off of the four controllable switching devices so that the PF of the synchronous full bridge rectifier circuit approaches unity.

5. The circuit of claim 4 wherein the controller comprises:

a fast PWM function to control the drive of the switches as a function the AC half cycles to emulate the rectified and multiplied AC input;

a slow DC output regulator loop that controls the DC output; and means for controlling the switching times of the rectifiers to prevent shoot through and provide ZVS operation.

6. The circuit of claim 1 wherein the AC input has two current carrying leads, and wherein the boost inductor comprises two mutually coupled inductors, one in each leg of the AC input.

7. A method for synchronously full wave rectifying an AC input to provide a DC output, the method comprising:

inductively reacting to current traveling from the AC input to a full bridge rectifier circuit, the full bridge having at least two controllable switches;

coupling the output from the full wave rectifier circuit to the DC output;

sensing current in the DC output;

sensing the charging currents to the inductive reactance;

sensing the AC signal and sending the sensed AC and the sensed currents to a controller; and wherein in response to the received signals, the controller turns on and off the at least two controllable switching devices in a manner where the PF of the synchronous full bridge rectifier approaches unity with respect to the AC source wherein the controller output signal are separate and independent signals, one such signal to each of the at least two controllable switches, wherein in one half cycle of the AC signal, one controllable switch is driven on and the other is intermittently driven on and off, and wherein during the other half cycle of the AC signal the other controllable switch is driven on and the one controllable switch is intermittently driven on and off.

8. The method of claim 7 wherein the step of sensing the AC signal comprises the steps of:

differential amplifying the AC input;

rectifying the differentially amplified AC signal; and presenting rectified differentially amplified signal to the controller, wherein the controller performs the method comprising the steps of:

determining the zero crossing over points and peaks of the rectified AC signal;

comparing the zero crossing points and peaks to the sensed current, and in re-sponse therefrom; and timing the turning on and off of the four controllable switching devices so that the PF of the synchronous full bridge rectifier circuit approaches unity.

* * * * *

UNITED STATES PATENT AND TRADEMARK OFFICE
CERTIFICATE OF CORRECTION

PATENT NO. : 7,269,038 B2
APPLICATION NO. : 11/224167
DATED : September 11, 2007
INVENTOR(S) : Sampat Shekhawat et al.

It is certified that error appears in the above-identified patent and that said Letters Patent is hereby corrected as shown below:

<u>Column 7</u>

Line 36, delete "RIO", substitute -- R10 --;

Line 64-67, delete "Also, soft turn-on is when the current to the filter capacitors is switched (not shown), in such a case the fast body diode MOSFET's Qb3 and Qb4 may be replaced by regular MOSFET's."

IN THE DRAWINGS

Replace Drawing Sheet 6 of 8 as attached.

Signed and Sealed this

First Day of April, 2008

JON W. DUDAS
*Director of the United States Patent and Trademark Office*

FIG. 5

FIG. 6A